(12) United States Patent
Lu et al.

(10) Patent No.: US 8,753,546 B2
(45) Date of Patent: Jun. 17, 2014

(54) COMPOSITE MATERIAL WITH DIELECTRIC PROPERTIES AND PREPARATION METHOD THEREOF

(75) Inventors: Yun Lu, Nanjing (CN); Tingyang Dai, Nanjing (CN); Xutang Qing, Nanjing (CN)

(73) Assignee: Nanjing University, Nanjing (CN)

( * ) Notice: Subject to any disclaimer, the term of this patent is extended or adjusted under 35 U.S.C. 154(b) by 672 days.

(21) Appl. No.: 12/993,333

(22) PCT Filed: Dec. 7, 2009

(86) PCT No.: PCT/CN2009/075364
§ 371 (c)(1),
(2), (4) Date: Nov. 18, 2010

(87) PCT Pub. No.: WO2011/069284
PCT Pub. Date: Jun. 16, 2011

(65) Prior Publication Data
US 2011/0233488 A1  Sep. 29, 2011

(51) Int. Cl.
*H01B 1/12* (2006.01)
*B32B 27/00* (2006.01)
*B32B 27/40* (2006.01)

(52) U.S. Cl.
USPC ............... 252/519.34; 252/519.33; 428/425.9

(58) Field of Classification Search
USPC ............. 252/500, 519.33, 519.34; 428/425.9
See application file for complete search history.

(56) References Cited

U.S. PATENT DOCUMENTS

| 4,855,266 A | 8/1989 | Burn |
| 2006/0264066 A1 | 11/2006 | Bartholomew et al. |
| 2007/0237488 A1 | 10/2007 | Oh et al. |
| 2008/0131776 A1 | 6/2008 | Sakuma et al. |
| 2008/0210124 A1 | 9/2008 | Keoshkerian |
| 2009/0087944 A1 | 4/2009 | Lin et al. |

FOREIGN PATENT DOCUMENTS

| CN | 1709966 A | 12/2005 |
| CN | 101041720 A | 9/2007 |
| CN | 101051697 | * 10/2007 |

OTHER PUBLICATIONS

Patent Cooperation Treaty Application No. PCT/CN2009/075364: International Search Report and Written Opinion dated Sep. 9, 2010, 12 pages.
Arbatti, M., et al., "Ceramic—Polymer Composites with High Dielectric Constant," Advanced Materials, May 2007, 19(10), 1369-1372.
Huang, C., et al., "High-Dielectric-constant all-polymer percolative composites," Applied Physics Letters, May 2003, 82(20), 3502-3504.
Qi, L., et al., "High-Dielectric-Constant Silver—Epoxy Composites as Embedded Dielectrics," Advanced Materials, Jul. 2005, 17(14), 1777-1781.
Shen, Y.J., et al., "Porous PVDF with LiClO4 complex as 'solid' and 'wet' polymer electrolyte," Solid State Ionics, Nov. 30, 2004, 175(1-4), 747-750.
Chen et al., "Self-Assembled Core-Shell Polymer Dielectric Prepared by Solution Casting Process", Integrated Ferroelectrics Paper, Sep. 27, 2009, 113(1), 1-8.

* cited by examiner

*Primary Examiner* — Harold Pyon
*Assistant Examiner* — Tanisha Diggs
(74) *Attorney, Agent, or Firm* — Baker & Hostetler LLP

(57) ABSTRACT

Techniques are generally described related to a composite material with dielectric properties and the preparation method thereof. One example composite material may include a core having a first polymer and an ionic salt and a shell having a second polymer, where the core is electrically conductive and the shell electrically insulates and substantially surrounds the core, wherein the first polymer has a first polarity and the second polymer has a second polarity, and the first polarity is greater than the second polarity.

20 Claims, 2 Drawing Sheets

COMPOSITE MATERIAL WITH DIELECTRIC PROPERTIES AND PREPARATION METHOD THEREOF

CROSS-REFERENCE TO RELATED APPLICATIONS

This application is the National Stage of International Application No. PCT/CN2009/075364, filed Dec. 7, 2009, the disclosure of which is incorporated herein by reference in its entirety.

BACKGROUND

Composite materials are widely used. For example, a composite material with dielectric properties may be used in capacitors or storage media. Traditionally, manufacture of polymer-based materials with dielectric properties involves the formation of a composite material by filling a polymer with nano- or microparticles of a metal, metal oxide, graphite, or conducting polymer. The strength and flexibility of such composite materials is lower than required for some applications and the dielectric constant obtained with such materials, about $10\text{-}10^3$, is too low for many applications. New composite materials with high dielectric constants are needed.

SUMMARY

One embodiment of the disclosure may generally relate to a composite material. The composite material may include a core having a first polymer and an ionic salt and a shell having a second polymer, where the core is electrically conductive and the shell electrically insulates and substantially surrounds the core, wherein the first polymer has a first polarity and the second polymer has a second polarity, and the first polarity is greater than the second polarity.

Another embodiment of the disclosure may generally relate to a method for preparing a composite material. The method may include mixing a first polymer, a second polymer, and an ionic salt in a solvent at a first temperature, wherein the first polymer has a lower solubility in the solvent than the second polymer; and vaporizing the solvent at a second temperature to form a composite material that includes a core and a shell, wherein the core includes the first polymer and the ionic salt, and the shell includes the second polymer.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
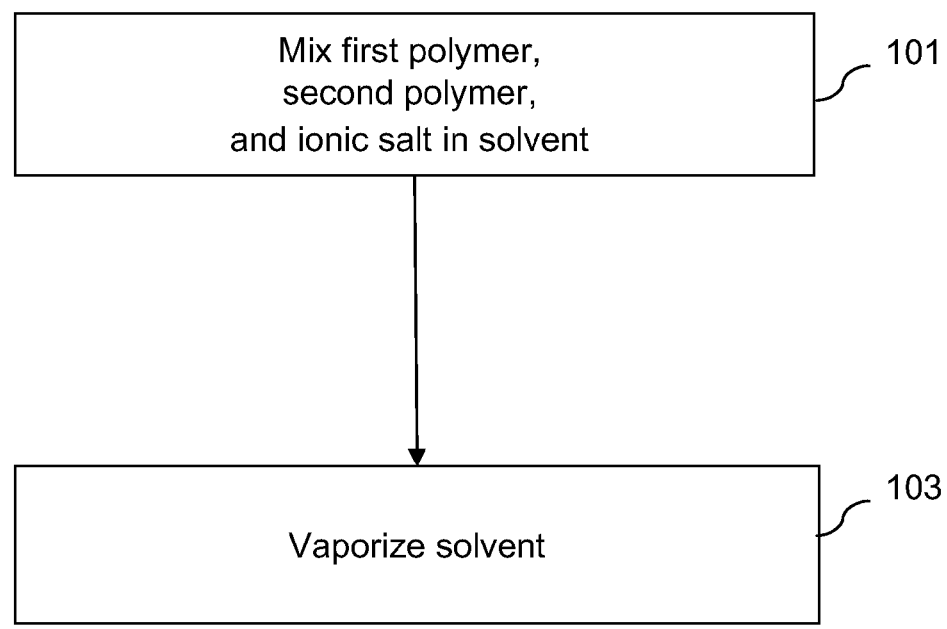
FIG. 1 is a flow chart of an illustrative embodiment of a method for preparing a composite material.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is drawn, inter alia, to a composite material with dielectric properties and methods and systems related to preparing the composite material.

The composite materials described herein contain an electrically conductive core and an electrically insulating shell that surrounds, e.g., substantially and/or completely, the core. The core contains a first polymer and an ionic salt, and the shell contains a second polymer. The polarity of the first polymer is generally greater than the polarity of the second polymer.

Methods of making composite materials are also described herein. The methods include mixing a first polymer, a second polymer, and an ionic salt in a solvent, with the first polymer having a lower solubility in the solvent than the second polymer. The solvent is vaporized, producing a composite material with a core and a shell, with the core containing the first polymer and the ionic salt, and the shell containing the second polymer. The core is generally electrically conductive and the shell generally electrically insulates and substantially and/or completely surrounds the core. The polarity of the first polymer is generally greater than the polarity of the second polymer. The temperatures at which mixing and vaporizing occur may be the same or different.

In this disclosure, a "conductive material" may generally refer to a material having movable electric charges, i.e., a material that is capable of conducting an electric charge. A "non-conductive material" or "insulating material" may generally refer to a material having few or no movable electric charges so that an electric current flowing in a non-conductive material is resisted and heat may be generated, i.e., a material that does not readily conduct an electric charge. The term "polarity" may generally refer to a separation of electric charge leading to a molecule having an electric dipole. The magnitude of a polarity of a material may be determined by a measurement of the dielectric constant of the material. The term "dielectric constant" of a material may generally refer to the frequency-dependent relative permittivity of the material.

The composite material includes a substantially conductive material and a substantially non-conductive material. The substantially conductive material and the substantially non-conductive material may form a core-shell structure, with the core containing the substantially conductive material and the shell containing the substantially non-conductive material. A percolation network may be formed within the core due to presence of an ionic material, such as an ionic salt, in the core of the composite material.

The substantially conductive material may be a complex. In some embodiments, the complex may include a first polymer having a first polarity and an ionic salt. The first polarity of the first polymer may be strong enough to complex the first polymer with the ionic salt. The strength of the first polarity may be determined based on the chemical structure of the first polymer. In some embodiments, the first polymer may include a carbon-halogen bond, a carbon-oxygen bond, or a carbon-nitrogen bond which has or contributes to the first polarity. The carbon-halogen bond may include, without limitation, a carbon-fluoride bond. In some embodiments, the first polymer may include, without limitation, a fluoropolymer, such as polyethylene fluoride, polyvinylidene fluoride, polyethylene hexafluoropropylene, polychlorotrifluoroethylene or their copolymers. The ionic salt may be any technically feasible salt that will form a complex with the first polymer. Examples of ionic salts may include, without limitation, sodium chloride, sodium nitrate, sodium phosphate, potassium chloride, lithium chloride, lithium perchlorate, lithium tetrafluoroborate or lithium hexafluoropropene.

The substantially non-conductive material may be a second polymer which has a second polarity of lower magnitude than the first polarity. The second polarity may be sufficiently weak that the second polymer does not form a complex with the ionic salt. In some embodiments, the second polymer may lack an atom with a relatively high electronegativity, such as fluoride, oxygen, or nitrogen. In some embodiments, the second polymer may include, without limitation, polyurethane, polymethylmethacrylate, polyacrylate, polyacrylonitrile, polystyrene, polyethylene, polyvinyl chloride or polypropylene. In one embodiment, the first polymer is a fluoropolymer and the second polymer is a non-fluorinated polymer.

In some embodiments, the composite material is in the form of a film, e.g., a polymer film, with an ultrahigh dielectric constant, e.g., about $10^4$ to about $10^7$. In some embodiments, the film has high tensile stress at break (e.g., about 5.1 MPa), high strain at break (e.g., about 14.4%), and high stiffness (e.g., Young's Modulus about 164.4 MPa). The high strength and flexibility of the composite material may make it suitable for use in materials such as capacitors, e.g., super capacitors, and memory materials, e.g., ultra high density storage devices.

A "sequential deposition" method for producing a composite material with dielectric properties is also provided. In some embodiments, a first polymer, a second polymer, and an ionic salt may be mixed in a solvent. The first polymer and the second polymer may be dissolved in the solvent. In addition, the first polymer and the second polymer may have a first solubility and a second solubility in the solvent, respectively. As set forth above, in some embodiments, the first polymer may form a complex with the ionic salt and the second polymer may fail to form a complex with the ionic salt. The first solubility may be lower than the second solubility. Therefore, when the solvent is vaporized, the dissolved first polymer and the ionic salt may precipitate first to form a core and the dissolved second polymer may then precipitate to form a shell that surrounds, e.g., substantially and/or completely, the core. Suitable solvents include, but are not limited to, methyl pyrrolidone, dimethyl formamide, dimethyl sulfoxide, tetrahydrofuran, ethyl acetate, dichloromethane, or chloroform.

In some embodiments, the mixture of first polymer, second polymer, ionic salt, and solvent is applied, e.g., cast, sprayed, or spin-coated, onto a substrate. A film material may be obtained after vaporization of the solvent. The solvent may be vaporized at room temperature, e.g. about 20 degrees to about 25 degrees Celsius, or at a temperature higher than room temperature, e.g., at a temperature greater than about 20 degrees to about 25 degrees Celsius. Depending on which solvent is used, the temperature may be chosen such that the temperature is suitable to effect vaporization of the solvent. In some embodiments, the solvent may be heated to a temperature of about 50 to about 150 degrees Celsius, about 50 to about 75, about 75 to about 100, about 100 to about 125, or about 125 to about 150 degrees Celsius.

In some embodiments, the mass ratio of the first polymer to the second polymer is about 0.5 to about 2. In some embodiments, the mass ratio of the first polymer to the ionic salt is about 1 to about 10. In some embodiments, the mass ratio of the first polymer to the solvent is about 0.01 to about 0.05.

In some embodiments, a composite material as described herein has a dielectric constant of at least about $10^4$, $10^5$, $10^6$, or $10^7$. In some embodiments, the composite material has a dielectric constant of about $10^4$ to about $10^7$, or about $10^4$ to about $10^5$, $10^5$ to about $10^6$, or about $10^6$ to about $10^7$. The dielectric constant may be measured as frequency-dependent relative permittivity, for example measured at about 100 Hz to about 1 MHz, for example with an applied voltage of about 0.1V.

Manufactured products containing a composite material with dielectric properties as described herein are also provided. In some embodiments, a capacitor, such as a super capacitor, containing the composite material is provided. In other embodiments, a memory material, such as ultra high density memory, containing the composite material is provided.

Electrodes may be placed on the composite material, for example a composite polymeric film, using a technique such as, but not limited to, vacuum sputtering or magnetic sputtering. The composite material, for example composite polymeric film, with electrodes may be used as a component in an electronic device. For example, during production of the composite material, a mixture of first and second polymers, ionic salt, and solvent, as described herein, may be deposited on a base material such as single crystal silicon or quartz using a technique such as, but not limited to, casting, spraying, or spin coating. After solvent vaporizes, the formed film may be incorporated into an electronic device, including but not limited to a capacitor, e.g., a super capacitor, or a memory device, e.g., an ultra high density storage device, or any electronic device or component in which a composite material with a high dielectric constant would be desirable.

FIG. 1 is a flow chart of an illustrative embodiment of a method 100 for preparing a composite material. Method 100 may include one or more operations, functions, or actions as illustrated by blocks 101 and/or 103. The various blocks are not intended to be limiting to the described embodiments. For example, the operations identified in one or more blocks may be separated into additional blocks, while in other examples various operations may be combined together. In other examples, one or more of the operations in the various blocks may be eliminated.

Processing for method 100 may begin at block 101 (mix first polymer, second polymer, and ionic salt in solvent), where a first polymer, a second polymer, and an ionic salt are introduced into a solvent. The first polymer, the second polymer, and the ionic salt may be dissolved in the solvent to form a substantially homogeneous solution. Processing may continue from block 101 to block 103. In block 103 (vaporize solvent), the solvent is vaporized, and the first polymer and the second polymer are precipitated in a predetermined order. In some implementations, the first polymer may precipitate first and complex with the ionic salt, and then the second polymer may precipitate on the complex and form a composite material.

In block 101, the first polymer, the second polymer, and the ionic salt are mixed in a solvent to form a resulting mixture. The first polymer and the second polymer may have a first solubility and a second solubility in the solvent, respectively. In some implementations, the first solubility may be lower than the second solubility. The solvent may be organic. Non-limiting examples of solvents include methyl pyrrolidone, dimethyl formamide, dimethyl sulfoxide, tetrahydrofuran, ethyl acetate, dichloromethane, and chloroform.

The mixture may be mixed to form a substantially homogenous solution. The mixture may be stirred for a predetermined time period. In some implementations, the predetermined time period may be longer than about one hour. The mixture may be stirred and heated to a first temperature at or higher than room temperature, e.g., about 20 to about 25 degrees Celsius. After the predetermined time period, the first polymer, the second polymer, and the ionic salt dissolve in the solvent and form a substantially homogeneous solution.

In block 103, the solvent of the substantially homogeneous solution may be vaporized. The substantially homogeneous solution may be placed at a second temperature. The second temperature may be at or higher than room temperature, e.g., about 20 to about 25 degrees Celsius. In some implementations, the second temperature is lower than the first temperature. During the vaporization process, the volume or amount of solvent decreases. When the solvent decreases to a first amount, the first polymer may precipitate while the second polymer is still dissolved in the solvent. In some implementations, the first polymer may have a relatively high surface tension and may form a substantially ball-shaped particle when it precipitates. The first polymer may have a first polarity which is strong enough to complex the ionic salt. When the solvent decreases to a second amount, the second polymer may precipitate on the complex of the first polymer and the ionic salt to form a composite material.

Figure 2:
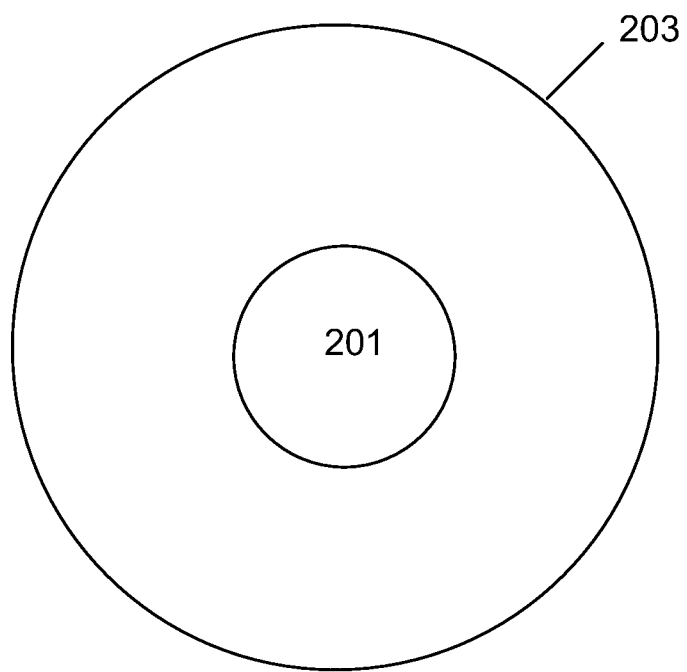
FIG. 2 shows an illustrative embodiment of a composite material.

FIG. 2 shows an illustrative embodiment of a composite material. The composite material 200 may include a core 201 and a shell 203. In some implementations, the core 201 may include a first polymer and an ionic salt. In addition, the core 201 may be electrically conductive. The shell 203 may include a second polymer may be electrically insulating.

The first polymer may have a first polarity and the second polymer may have a second polarity. In some implementations, the first polarity may be greater than the second polarity. The first polymer may form a complex with an ionic salt and the second polymer may fail to form a complex with the same ionic salt because the first polymer has a greater polarity than the second polymer.

The following examples are only for illustration and should not be construed as limiting the scope of the current disclosure.

Example 1

5 grams of poly vinyl fluoride, 6 grams of polyurethane, and 3 grams of lithium chloride were added into 150 ml of N-methyl pyrrolidone to form a mixture. At about 90 degrees Celsius, the mixture was stirred with a magnetic blender for about 24 hours to form a transparent colorless solution. Then, the solution was injected to a quartz mold and cooled to about 50 degrees Celsius to vaporize N-methyl pyrrolidone. The weight of the solution may be constantly measured to determine whether the solvent (i.e., N-methyl pyrrolidone) of the solution is vaporized. When the weight achieves a constant, it may mean the solvent is vaporized. After N-methyl pyrrolidone was vaporized, a polymer film at the thickness of about 100 um was obtained.

The dielectric constant of the polymer film was measured by Hewlett-Packard Impedance Analyzer 4194A. The applied voltage was about 0.1 volts and the frequency range was about $10^2 \sim 10^6$ Hz. The dielectric constant of the polymer film was measured to be $10^4 \sim 10^7$.

Example 2

6 grams of PVDF (polyvinylidene fluoride), 4 grams of polyacrylonitrile, and 3 grams of lithium tetraflurroborate were added into 200 ml of N-dimethylformamide to form a mixture. At about 150 degrees Celsius, the mixture was stirred with a magnetic blender for about 6 hours to form a transparent yellow solution. Then, the solution was injected to a quartz mold and cooled to about 80 degrees Celsius to vaporize N-dimethylformamide. After N-dimethylformamide was vaporized, a polymer film at the thickness of about 100 um was obtained.

In the frequency range of $10^2 \sim 10^6$ Hz and at the applied voltage of 0.1 volts, the dielectric constant of the polymer film was measured to be $10^4 \sim 10^7$.

Example 3

6 grams of PVDF, 6 grams of polystyrene, and 3 grams of sodium nitrate were added into 220 ml of tetrahydrofuran to form a mixture. At about 80 degrees of Celsius, the mixture was stirred with a magnetic blender for about 12 hours to form a transparent light yellow solution. Then, the solution was injected to a quartz mold and cooled to about 50 degrees Celsius to vaporize tetrahydrofuran. After tetrahydrofuran was vaporized, a polymer film at the thickness of about 100 um was obtained.

In the frequency range of $10^2 \sim 10^6$ Hz and at the applied voltage of 0.1 volts, the dielectric constant of the polymer film was measured to be $10^5 \sim 10^6$.

Example 4

4 grams of poly chlorotrifluoroethylene, 6 grams of polymethylmethacrylate, and 4 grams of lithium hexafluorophosphate were added into 150 ml of dichloromethane to form a mixture. At the room temperature, the mixture was stirred with a magnetic blender for about 72 hours to form a transparent colorless solution. Then, the solution was injected to a quartz mold to vaporize dichloromethane at the room temperature. After dichloromethane was vaporized, a polymer film at the thickness of about 100 um was obtained.

In the frequency range of $10^2 \sim 10^6$ Hz and at the applied voltage of 0.1 volts, the dielectric constant of the polymer film was measured to be $10^4 \sim 10^5$.

Example 5

8 grams of poly HFP (hexafluoropropylene), 6 grams of polypropylene, and 5 grams of sodium phosphate were added into 180 ml of dimethyl sulfoxide to form a mixture. At about 120 degrees Celsius, the mixture was stirred with a magnetic blender for about 8 hours to form a transparent colorless solution. Then, the solution was injected to a quartz mold and cooled to about 50 degrees Celsius to vaporize dimethyl sulfoxide. After dimethyl sulfoxide was vaporized, a polymer film at the thickness of about 100 um was obtained.

In the frequency range of $10^2 \sim 10^6$ Hz and at the applied voltage of 0.1 volts, the dielectric constant of the polymer film was measured to be $10^4 \sim 10^6$.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A composite material, comprising:
   a core comprising a first polymer and an ionic salt, wherein the first polymer comprises a fluoropolymer, and wherein the core is electrically conductive; and
   a shell comprising a second polymer, wherein the second polymer comprises polyurethane, and wherein the shell electrically insulates and substantially surrounds the core,
   wherein the first polymer has a first polarity and the second polymer has a second polarity, and the first polarity is greater than the second polarity.

2. The composite material of claim 1, wherein the composite material has a dielectric constant greater than 10,000.

3. The composite material of claim 1, wherein the first polymer and the ionic salt form a complex.

4. The composite material of claim 1, wherein the second polymer and the ionic salt do not form a complex.

5. The composite material of claim 1, wherein the first polymer comprises an atom selected from the group consisting of fluorine, oxygen, nitrogen, or a combination thereof.

6. The composite material of claim 5, wherein the atom is covalently bound to a carbon atom.

7. The composite material of claim 1, wherein the fluoropolymer is selected from the group consisting of polyethylene fluoride, polyvinylidene fluoride, polyethylene hexafluoropropylene, polychlorotrifluoroethylene, and copolymers thereof.

8. The composite material of claim 1, wherein the composite material has a dielectric constant of at least about $10^4$.

9. The composite material of claim 1, wherein the ionic salt is selected from the group consisting of sodium chloride, sodium nitrate, sodium phosphate, potassium chloride, lithium chloride, lithium perchlorate, lithium tetrafluoroborate, and lithium hexafluoropropene.

10. The composite material of claim 1, wherein the composite material is a film.

11. The composite material of claim 10, wherein the film has a dielectric constant of about $10^4$ to about $10^7$.

12. The composite material of claim 10, wherein the film is a composite polymeric film.

13. The composite material of claim 1, wherein a mass ratio of the first polymer to the second polymer is about 0.5 to about 2.

14. The composite material of claim 1, wherein a mass ratio of the first polymer to the ionic salt is about 1 to about 10.

15. A film, comprising:
    a core comprising a first polymer and an ionic salt, wherein the first polymer comprises a fluoropolymer, and wherein the core is electrically conductive; and
    a shell comprising a second polymer, wherein the second polymer comprises polyurethane, and wherein the shell electrically insulates and substantially surrounds the core,
    wherein the first polymer has a first polarity and the second polymer has a second polarity, and the first polarity is greater than the second polarity.

16. The film of claim 15, wherein the film has a dielectric constant of about $10^4$ to about $10^7$.

17. The film of claim 15, wherein a mass ratio of the first polymer to the second polymer is about 0.5 to about 2.

18. The film of claim 15, wherein a mass ratio of the first polymer to the ionic salt is about 1 to about 10.

19. The film of claim 15, wherein the first polymer and the ionic salt form a first complex, and wherein the second polymer and the ionic salt do not form a second complex.

20. The film of claim 15, wherein the film has a dielectric constant greater than 10,000 when measured as frequency-dependent relative permittivity.

* * * * *